United States Patent [19]

Voigt

[11] 4,118,105
[45] Oct. 3, 1978

[54] OPTICAL COUPLING

[75] Inventor: K. J. Voigt, Fürstenfeldbruck, Fed. Rep. of Germany

[73] Assignee: Max-Planck-Gesellschft zur Forderung der Wissenschaften e.V., Fed. Rep. of Germany

[21] Appl. No.: 697,692

[22] Filed: Jun. 18, 1976

[30] Foreign Application Priority Data

Jun. 23, 1975 [DE] Fed. Rep. of Germany ... 7519901[U]

[51] Int. Cl.² .............................................. G02B 5/14
[52] U.S. Cl. ................... 350/96.20; 250/552; 250/227
[58] Field of Search ................... 350/96 C, ; 250/227, 250/239, 552, 551

[56] References Cited

U.S. PATENT DOCUMENTS

| 3,803,409 | 4/1974 | Prochazka | 350/96 C X |
| 3,954,338 | 5/1976 | Hennel | 350/96 C X |

OTHER PUBLICATIONS

Parfitt C. A., Ellis B., "Interconnections and Switches for Glass-fibre Optical Links" Electronic Components, Jan. 1972, pp. 69, 73–75.

*Primary Examiner*—John K. Corbin
*Assistant Examiner*—Rolf Hille
*Attorney, Agent, or Firm*—Brumbaugh, Graves, Donohue & Raymond

[57] ABSTRACT

An optical coupling includes a socket, in which an electro-optical element is mounted, and a plug, in which a light-conducting element is fastened. The plug mateably engages the socket in such a manner that the electro-optical element and the light-conducting element are optically connected. The electro-optical element is removeably and axially adjustably mounted in the socket so that the electro-optical element can be replaced and optimum focusing and light-transmitting efficiency can be attained.

11 Claims, 2 Drawing Figures

OPTICAL COUPLING

BACKGROUND OF THE INVENTION

The present invention relates essentially to a coupling for optically connecting a light-conducting element and an electro-optical element. Such optical couplings may, for example, be used to optically connect optical fibers with a light-emitting diode, photodiode or phototransistor.

Commercial light conductors consist of a bundle of very fine optical fibers, made of glass or quartz and the like. The fiber bundle is surrounded by an enveloping tube. A socket with a terminal opening is pushed and fastened over each end of the tube. The ends of the individual fibers exit at the terminal openings, and are face ground there. In order to optically couple an electro-optical element to an end of the light conductor, a suitable coupling element may be provided with a bore, having a diameter which corresponds with the diameter of the socket at the end of the light conductor. An electro-optical element can then be introduced from one side of the coupling element and the light conductor can be pushed into the coupling element from the opposite side. The diameter of the sockets of the light conductor corresponds to the diameter of the housing of the electro-optical element, which is usually mounted in a TO18 or TO46 housing. Such housings are commonly used for transistors, and supplied with a transparent end surface which is usually a glass disk or a focusing lens. The distance between the electro-optical element and the end of the light conductor can be adjusted by pushing the light conductor back and forth in the coupling element, so as to achieve optimum focusing and maxium light-transmitting efficiency. The distance can then be set by fixing the light conductor in the coupling element with setscrews or a permanent adhesive bond.

Heretofore, coaxial connectors also have been used as optical couplings, the end of a light conductor being glued into a plug of the coaxial connector. A matching socket, which is sold commercially with the plug as part of the coaxial connector, comes with built-in insulating inserts and contact elements. Thus, the socket must be modified to make it suitable for use with the plug having the light conductor therein. For this purpose, the contact elements are usually removed from the socket and the insulating inserts are bored out to the diameter of the housing of the electro-optical element. The electro-optical element, for example a light-emitting diode, a photodiode or a phototransistor, is then inserted into the socket and firmly glued in place. One disadvantage of these prior art optical couplings is that the electro-optical element cannot be replaced, in case of a deflect or different experimental purpose, without replacing the entire socket.

SUMMARY OF THE INVENTION

It is an object of the present invention to provide an optical coupling which avoids the problems and disadvantages of the prior art couplings noted above. More specifically, an object of the invention is to eliminate the burden of boring out the insulating inserts and to supply a socket which can be constructed simply from commercially available parts. Another object is to provide a socket which is capable of mating with a corresponding plug having a light conductor, as well as centering and replaceably mounting an electro-optical element therein.

These objects, as well as other objects which will become apparent in the discussion that follows, are achieved, according to the present invention, in a coaxial connector having a plug and a socket. Both the plug and the socket of a ee sual coax comprising include a metallic housing into which is pressed an insulating insert. In the center of the insulating insert, there is a pin or a receptacle matching the pin which is soldered to the inner conductor of a coaxial cable. Furthermore, shims and insulating rings are generally supplied with the coaxial connector for aiding the electrical connection of the shielding of the coaxial cable to the housing of the plug or socket.

In accordance with the present invention, the insulating insert with its pin or receptacle is removed from the housing of the socket. The electro-optical element is then mounted in the housing between a pair of insulating rings, and fixed in position with the help of a ring nut, which is normally used for anchoring the connected coaxial cable at the rear of the socket. To form an optical coupling, a light conducting element is fastened coaxially to the plug which mateably engages the socket in such a manner that the light conductor is optically connected to the electro-optical element.

Since the insulating rings are, for the most part, manufactured from an elastic material, it is not necessary to adjust their internal diameter in proportion to the exterior diameter of the electro-optical element. Moreover, tightening the ring nut automatically centers the electro-optical element in the middle of the socket. The present invention, therefore, eliminates the necessity of boring out the built-in insulating insert which, heretofore, required the use of relatively precise templates so that the bore would not be at an angle to the electro-optical element. Otherwise, an undesirable decrease in light-transmitting efficiency would result.

Suitably dimensioned spacers can be used for fixing the axial position of the electro-optical element within the socket. Thus, when assembling the optical coupling, the distance between the lens of the electro-optical element and the end of the light conductor can be fixed for optimum focusing of the light emanating from an emitter of the electro-optical element onto the end of the light conductor or for optimum focusing of the light emanating from the light conductor onto a receiver of the electro-optical element. Optimum focusing results in optimum light-transmitting efficiency, which may be maintained even after repeatedly assembling and disassembling the optical coupling of the present invention.

The two insulating rings insulate the housing of the socket from the housing of the electro-optical element and from connecting conductors protruding from the rear of the electro-optical element. In addition, the connecting conductors can be insulated from the ring nut by an insulating wafer in the form of a small insulating plate. The insulating wafer, which is inserted into the socket from the rear, has openings for the connecting conductors.

The distance between the electro-optical element and the light conductor may also be adjusted by coaxially fastening the light conductor in sleeve having an externally threaded portion, which can be screwed into an internally threaded portion of the plug of the optical coupling. In accordance with this embodiment, the axial position of the light conductor in the plug is determined by the depth to which the sleeve is screwed into the plug. When the light conductor occupies an optimum position relative to the electro-optical element, it may be fixed in position by a lock nut. The threaded connection between the light conductor and plug acts to center the light conductor. To improve the centering, however, a portion of the inner cross-section of the plug can be shaped so as to form a centering cross-section for the front portion of the sleeve which surrounds the end of the light conductor.

The optical coupling of the present invention may be constructed simply by utilizing the plug and socket of a BNC coaxial connector. Such commercial connectors come equipped with the insulating, elastic rings which, in accordance with the invention, are used for fixing the position of the electro-optical element. The shims, which aid in adjusting the distance between the lens of the electro-optical element and the end of the light conductor, are also normal equipment with a BNC coaxial connector.

The shims prevent direct glass to glass contact between the lens of the electro-optical element and the optical fibers of the light conductor. Such contact damages the glass surfaces resulting in decreased light-transmitting efficiency. The glass surfaces also are protected to a certain extent by the elasticity of the insulating rings, which permit a certain amount of movement of the electro-optical element in the socket.

When using a commercial coaxial connector, such as a BNC coaxial connector, the advantages are, apart from the slight financial cost, the availability of the total coaxial connector with accessories, such as caps for covering a portion of the connector not in use, as well as fastening fittings with mating drilling templates and other accessories. Since, in practice, a BNC coaxial connector has already shown itself to be most suitable for conversion to an optical coupling, the prsent invention will be described in greater detail by referring to the parts of such a BNC coaxial connector.

BRIEF DESCRIPTION OF THE DRAWINGS

For a further understanding of the present invention, reference may be had to the accompanying drawings, in which.

DESCRIPTION OF THE PREFERRED EMBODIMENTS

Figure 1:
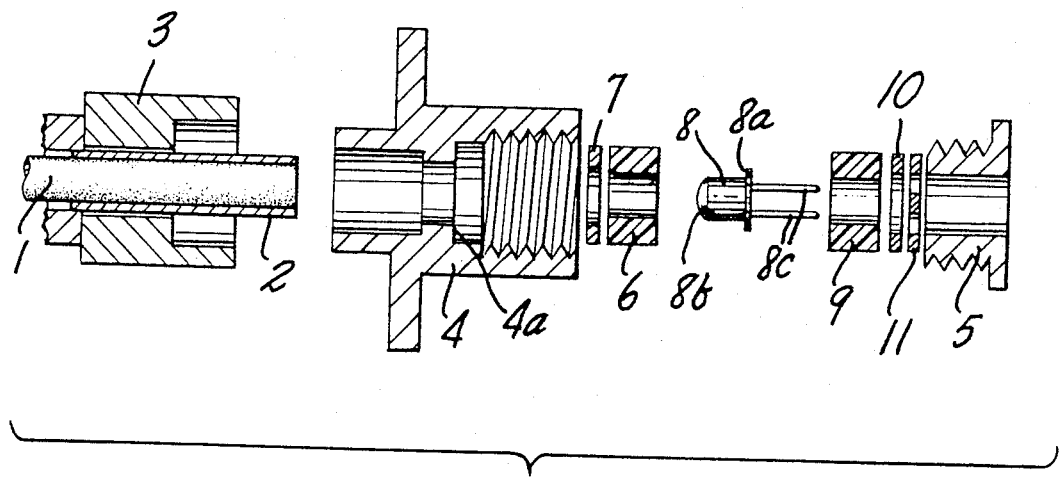
FIG. 1 is an exploded, cross-sectional view of an optical coupling in accordance with the present invention.

The preferred embodiments of the present invention will now be described with reference to FIGS. 1 and 2 of the drawings. Identical elements in the various figures will be designated by the same reference numerals.

Referring to FIG. 1, the end of a light conductor 1 is fastened coaxially in a sleeve 2, which is fastened in plug 3 by gluing or other suitable means. The mating socket includes a housing 4, from which the insulating and contact elements are removed. A ring nut 5 is provided with external threads so that it can be screwed into the internally threaded end of the housing 4. The housing 4 has an internal shoulder 4a, against which a first insulating ring 6 abuts. If necessary, insulating a spacer 7, having an internal diameter somewhat larger than the internal diameter somewhat larger than the internal diameter of the insulating ring 6, can be inserted between the shoulder 4a and the insulating ring 6 so that the housing of an electro-optical element 8 remains insulated from the housing 4 of the socket.

In the assembled state, the electro-optical element 8 sits within the first insulating ring 6, against which one end surface of a circumferential flange 8a of the electro-optical element 8 abuts. A lens 8b of the electro-optical element 8 is directed into the opening formed in the housing 4 of the socket by the shoulder 4a, so that the electro-optical element can be optically connected to the end of the light conductor 1. Connecting conductors 8c protrude rearwardly from the electro-optical element 8, and extend through an opening in a second insulating ring 9. In the assembled state, the insulating ring 9 abuts the other side of the circumferential flange 8a of the electro-optical element 8. The insulating ring 9, with the insertion of a shim 10, is secured in the housing 4 of the socket by the ring nut 5.

Depending on how far the ring nut 5 is screwed into the housing 4 of the socket, the axial position of the electro-optical element 8 can be adjusted within the housing 4 of the socket. In this manner, fine focusing of the electro-optical element 8 in regard to the end of the light conductor 1 is made possible. If necessary, one or more spacers 7, of suitable thickness, can be used for coarse focusing.

The connecting conductors 8c of the electro-optical element 8 are insulated by the insulating ring 9 against the interior of the housing 4 of the socket. They can be insulated additionally by pieces of insulating tubing. If necessary, an additional insulating wafer 11 also can be used. The insulating wafer 11 has a number of openings, corresponding to the number of connecting conductors 8c, through which the connecting conductors 8c can be fed before they are threaded through the pieces of insulating tubing.

This embodiment of the present invention offers many advantages. First of all, individual, commercially available parts can be used, for which no special manufacture is required. The assembly of the electro-optical element in the socket is relatively simple. At the same time, the electro-optical element is insulated from the housing and centered with sufficient accuracy, without having to take special measures. This dual function is performed by the rubber insulating rings, which normally come as standard equipment with coaxial connectors where they are used for guiding and clamping the cable. The insulating rings, furthermore, are somewhat resilient, so that even it there should be glass-to-glass contact between the lens of the electro-optical element and the optical fibers of the light conductor damage to the glass surfaces would not occur so readily. Finally, the invention permits the simple and rapid replacement of the electro-optical element in case of a defect or a change in the type of element. The BNC coaxial connector, described with reference to the present invention, permits the utilization of the total BNC connector which, in addition to the plug and socket, makes available a whole array of additional elements, such as caps for covering parts not in use and drilling templates etc.

Figure 2:
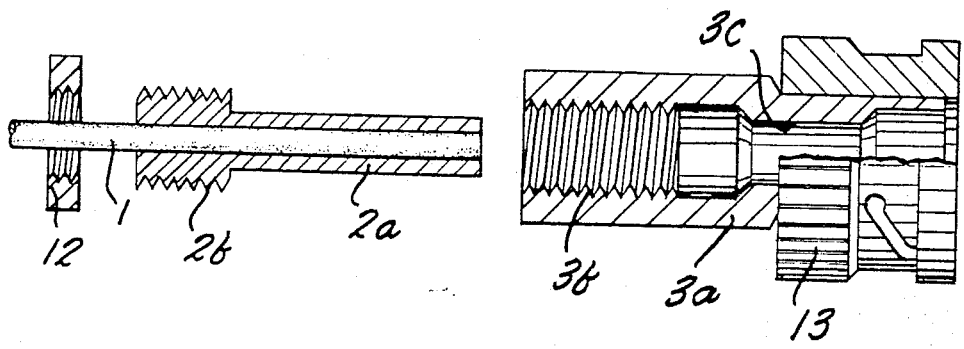
FIG. 2 is an exploded, cross-sectional view of an alternate embodiment for fastening a light conductor in a plug of the optical coupling of FIG. 1.

Referring now to FIG. 2, there is shown the end of the light conductor 1 fastened coaxially in a sleeve 2a, which is modified from that in FIG. 1. More particularly, an externally threaded portion 2b is provided on the sleeve 2a. A plug 3a is provided with a corresponding internally threaded portion 3b, so that the sleeve 2a can be screwed into the plug 3a. The distance from the end of the light conductor 1 to the lens 8b of the electro-optical element 8, mounted in the socket as shown in FIG. 1, can be adjusted by the depth to which the sleeve 2a is screwed into the plug 3a. By screwing a lock nut 12 onto the other end of the externally threaded portion 2b of the sleeve 2a and tightening it against the plug 3a, the optimum position of the light conductor 1 can be fixed in the plug 3a.

If the threaded portions 2b and 3b are sufficiently long, there is adequate centering of the end of the light conductor 1 in the plug 3a. If however, for constructional reasons or for reasons of more rapid assembly, it is undesirable to make the threads too long, then it is recommended to shape a portion of the bore of the plug 3a as a centering cross-section 3c. The internal diameter of the centering cross-section 3c corresponds to the external diameter of the sleeve 2a so that, in the assembled state, the sleeve 2a is guided at centering cross-sections 3b and 3c of the plug 3a, and is thereby centered. A locking ring 13 may be used to prevent the plug 3a from being disengaged from the socket.

Compared with the prior art methods and devices for fixing a light conductor in a plug, the embodiment described in FIG. 2 permits a very simple and rapid assembly with extremely accurate centering. Furthermore, when the plug is used with different sockets for which the electro-optical element is not always mounted in exactly the same position, the axial position of the end of the light conductor can be adjusted simply. The adjustment of a plug of the above-described type can be done from the front, and is, therefore, simpler than the adjustment of sockets, which must be done form the rear.

It will be understood that the above described embodiments are merely exemplary and that persons skilled in the art may make many variations and modifications without departing from the spirit and scope of the invention. All such modifications and variations are intended to be included within the scope of the invention as defined in the appended claims.

I claim:

1. In an optical coupling including a socket, in which an electro-optical element having a housing, a circumferential flange about the housing, a lens in one end of the housing and conductors protruding from the other end of the housing is mounted, the socket having an axial bore therethrough from one end to the other end, an internally threaded portion at one end of the socket and an internal shoulder extending into the bore between the ends of the socket; mounting means cooperating with the threaded portion of the socket for removeably mounting the electro-optical element in the socket, whereby the electro-optical element may be replaced and optimum focusing and light-transmitting efficiency may be obtained; and a plug, in which a light-conducting element is fastened coaxially, mateably engaging the other end of the socket in such a manner that the electro-optical element and the light-conducting element are optically connected, the improvement comprising: resilient means located in the bore of the socket between the internal shoulder and the mounting means and sandwiched between the socket and the electro-optical element for insulating and self-centering the electro-optical element in the socket, the resilient means including a first insulating ring positioned in the bore of the socket at the one end thereof, one end of the first insulating ring abutting the internal shoulder of the socket and the other end of the first insulating ring abutting the side of the circumferential flange of the electro-optical element nearest the one end of the housing of the electro-optical element, and a second insulating ring positioned in the bore of the socket at the one end thereof, one end of the second insulating ring abutting the side of the circumferential flange of the electro-optical element nearest the other end of the housing of the electro-optical element.

2. An optical coupling according to claim 1, wherein the first and second insulating rings are elastic.

3. An optical coupling according to claim 1, further comprising at least one spacer arranged between the internal shoulder of the socket and the first insulating ring for adjusting the axial position of the electro-optical element in the socket.

4. An optical coupling according to claim 3, wherein the axial dimension of the first insulating ring and the number of and axial dimensions of the spacers are such that contact between the light-conducting element and the electro-optical element is prevented.

5. An optical coupling according to claim 4, wherein the axial dimension of the first insulating ring and the number and axial dimensions of the spacers are such that optimum light-transmitting efficiency between the light-conducting element and the electro-optical element is achieved.

6. An optical coupling according to claim 1, wherein the mounting means includes a ring nut having an externally threaded portion releasably and adjustably engaging and mating with the internally threaded portion of the socket in such a manner that the ring nut engages the other end of the second insulating ring to adjust the axial position of the electro-optical element in the socket.

7. An optical coupling according to claim 6, further comprising an insulating wafer positioned between the second insulating ring and the ring nut, the insulating wafer having openings through which the conductors of the electro-optical element pass.

8. An optical coupling according to claim 1, wherein the plug includes an internally threaded portion; and further comprising a sleeve coaxially fastened to the light-conducting element, the sleeve having an externally threaded portion releasably and adjustably engaging and mating with the internally threaded portion of the plug, and a lock nut releasably and adjustably engaging and mating with the externally threaded portion of the sleeve in such a manner that the sleeve is fixedly positioned in the plug.

9. An optical coupling according to claim 8, wherein the plug includes a portion having an inner cross-section shaped so as to center the sleeve in the plug.

10. An optical coupling according to claim 1, wherein the plug and socket are formed from a BNC coaxial connector.

11. An optical coupling according to claim 1, wherein the outer diameter of the first insulating ring is greater than the outer diameter of the flange about the housing of the electro-optical element.

* * * * *